United States Patent Office 2,932,592
Patented Apr. 12, 1960

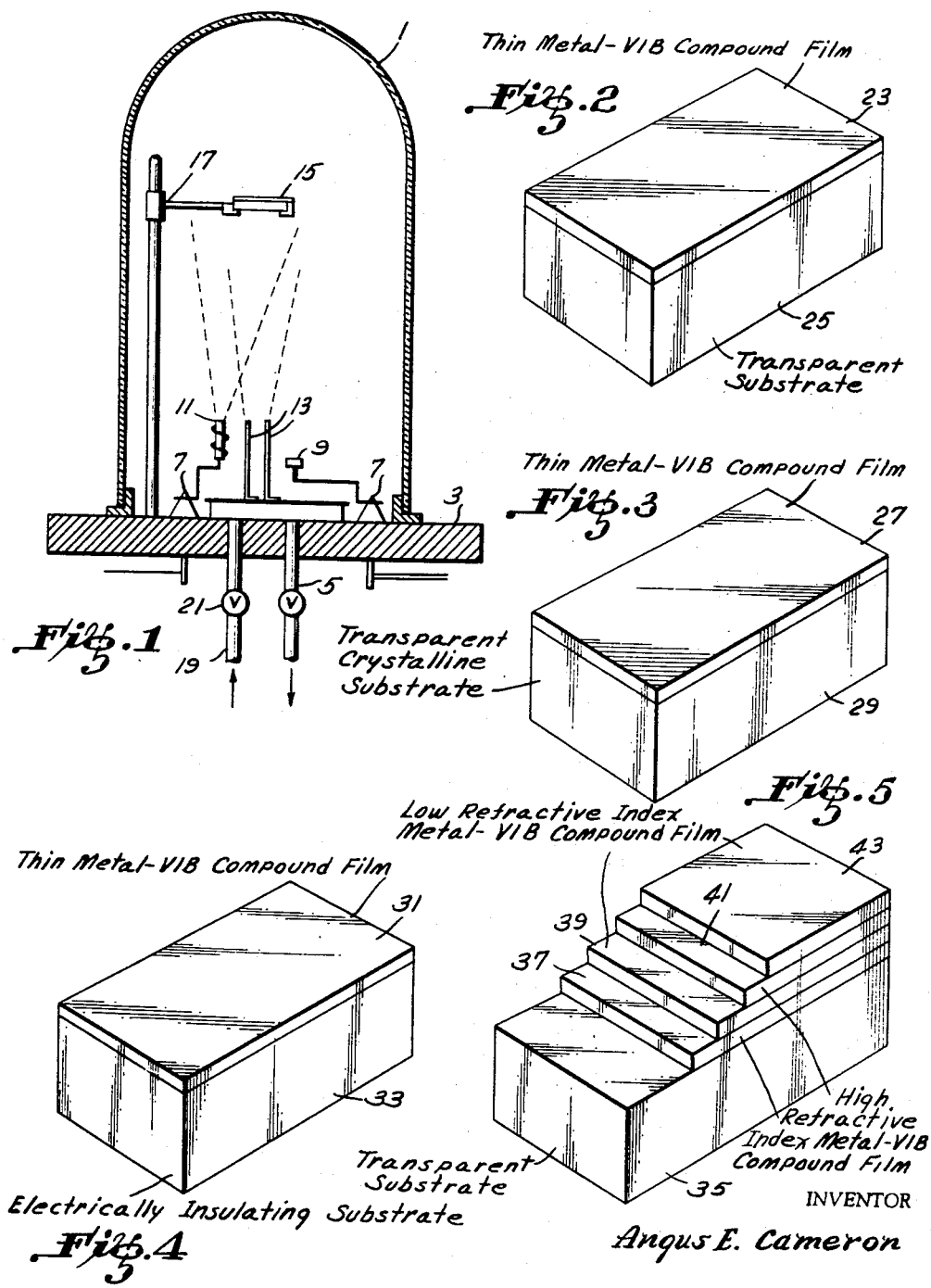

2,932,592

METHOD FOR PRODUCING THIN FILMS AND ARTICLES CONTAINING SAME

Angus E. Cameron, Oak Ridge, Tenn.

Application June 22, 1953, Serial No. 363,403

20 Claims. (Cl. 117—211)

This invention relates to a new and improved process for providing articles with thin layers of materials with desirable light reflecting and transmitting, and electrical conducting characteristics.

Coating of materials by the evaporation of a substance in vacuum is a well established art. The substance to be evaporated is contained in a refractory crucible, adapted to be heated by a suitable means, or is applied directly to a trough, basket, or coil of a metal which will stand the necessary temperature and will not react unduly with the charge material. The pressures employed range from a few microns down to 0.01 micron. The coatings customarily applied for producing mirrors or decorative coatings are very thin, being in the order of a few hundred angstroms, so that relatively small amounts of coating material suffice and low evaporation rates are satisfactory.

The rate of evaporation from a surface in vacuum is given by the Langmuir equation:

$$G = \frac{p_{mm}}{17.14}\sqrt{M/T}$$

where $G$ is $g \cdot cm.^{-2}/sec.^{-1}$, $M$ is the molecular weight, and $T$ is the absolute temperature.

A vapor pressure of $10^{-3}$ mm. Hg gives a sufficiently rapid evaporation rate for most purposes, and is attained at temperatures which are relatively low compared to the normal boiling point of the substance.

Evacuation serves also the further purpose of preventing reaction between air and the substance being evaporated and of cleaning the surface upon which vapor deposition is to occur, since adsorbed water vapor and other gases are removed.

Inorganic compounds generally undergo greater or less decomposition. Halides of the alkali and the alkaline earth metals evaporate without decomposition, but lead and bismuth fluorides, for example, decompose into the elements upon heating in vacuum. Some compounds, like certain oxides, appear to evaporate satisfactorily but give rise to coatings which are dark in color because of partial decomposition and loss of oxygen.

The principal object of the present invention is to provide a method for producing relatively thin layers of certain inorganic compounds which cannot be evaporated, even in high vacuum, without partial or complete decomposition.

Another object of this invention is to provide a method for producing coatings on various substrates regardless of their crystalline structure, water solubility or chemical composition.

A further object of this invention is to provide a method for producing coatings of selected light wave length transmission, such as transparent to infrared or ultraviolet and opaque to visible wave lengths, or vice versa.

Still another object of this invention is to provide a method for producing non-reflecting coatings of single layer or multi-layer deposits.

Other objects of this invention include the provision of a process for making interference filters with alternate layers of high and low refractive index; for applying coatings to water soluble materials without impairing the original light transmission characteristics thereof; for preparing layers of any predetermined oxidation state; for introducing impurity centers in the main layers of a semiconductor as it is being formed; and for producing thin separable layers.

Further objects of this invention include the provision for new articles of manufacture comprising transmissions filters for infrared but not visible wave lengths; welding goggles for transmission of visible but not infrared or ultraviolet wave lengths; and soluble-base optical elements for infrared transmission. Other articles of manufacture include reflecting filters and mirrors; non-reflecting optical elements, such as lenses, prisms and windows; infrared spectrometer elements; and optical elements with thin non-crystalline inorganic compound layers. Still other articles of manufacture include photosensitive cells, such as infrared, visible and ultraviolet wave length detectors; and semi-conductors with impurity centers, as represented by "transistor" type semi-conductors and "xerographic" plates.

More specifically, I have discovered a process for depositing molecular layers of the reaction product of a metal vapor and a vaporized non-metal of periodic group VIB (O, S, Se, Te) on a surface of an article by maintaining the article in an evacuated zone between $10^{-3}$ and $10^{-6}$ mm. mercury pressure; by maintaining the temperature of the surface of the article to be coated above the condensation point of the non-metal for the pressure employed; and by simultaneously exposing the surface of the article to the metal vapor and the non-metal vapor for the length of time required for the deposition of a layer of the resulting reaction product of the desired thickness on the surface of the article.

Furthermore, the present invention is directed to new and improved articles of manufacture wherein the surface or surfaces of one or more optical elements are coated with a thin layer or layers of amorphous, or non-crystalline compound or compounds.

In the accompanying drawings, which form a part of the specification

Fig. 1 shows one embodiment of an apparatus for preparing thin films of compounds from their elements on a substrate in accordance with the method of the present invention.

Fig. 2 shows an article of manufacture with a transparent substrate on which has been deposited a thin film of reaction product made according to the method of this invention.

Fig. 3 shows an article of manufacture similar to that shown in Fig. 2, except that here the thin film has been deposited on a transparent, crystalline substrate.

Fig. 4 shows an article of manufacture similar to that shown in Fig. 2, except that here the thin film has been deposited on an electrically insulating substrate.

Fig. 5 shows an article of manufacture consisting of multiple and alternate layers of high and low refractive index films, respectively, on a transparent substrate as produced by the method of the invention described herein.

In Fig. 1, bell jar 1 rests on plate 3 containing vacuum line 5 and two independently adjustable electrical heating circuits 7. Within the bell jar 1 and supported on plate 3, a cationic element evaporation boat 9 and an anionic element evaporator 11 are separated by reflecting heat shields 13. An article 15, to be coated, is held in position above the evaporators 9 and 11 by support 17. Inlet line 19, attached to an opening in plate 3, is provided with valve 21 for the alternate introduction of vapor of one reacting element, e.g. oxygen.

In Fig. 2, the very thin metal-VIB compound film 23 is deposited on and adheres firmly to the transparent substrate 25.

In Fig. 3, the very thin metal-VIB compound film 27 adheres firmly to the transparent crystalline substrate 29.

In Fig. 4, the very thin metal-VIB compound film 31 adheres firmly to the electrically insulating substrate 33.

In Fig. 5, the transparent substrate 35 supports the successively deposited very thin alternate layers of high refractive index and low refractive index metal-VIB compound films 37, 39, 41 and 43.

The present invention embraces the preparation of coatings of oxides, sulfides, selenides and tellurides of metals capable of reacting with the corresponding non-metals to form the coating compound by the simultaneous treatment of the surface being coated with the metal and the non-metal vapors derived from separate sources. This is obtained by the simultaneous evaporation of separate portions of metal and non-metal where sulfides, selenides or tellurides are formed, or by the generation in or introduction of oxygen into the zone in which the metal is evaporated and the compound formed is being deposited on the surface of the article.

The surfaces which are being coated are maintained at a sufficiently high temperature that the non-metal, when using sulfur, selenium or tellurium, does not itself deposit thereon, but the reaction occurs with the metal being evaporated and a film of the desired compound forms on the surface.

By the use of the present invention it is possible to produce films, such as sulfides, which cannot be produced by evaporating the metal sulfide in vacuum without decomposition and the films so produced by the present invention are superior in optical properties since they can be produced without a deficiency of non-metal and without the "muddiness" and darkening of films typical with a deficiency of electronegative elements.

It is not intended to exclude from this invention the preparation of films which are deliberately made deficient in non-metal, such as, by a reduction in the rate of impingement of the non-metal vapor on the target-surface. Furthermore, the invention contemplates the production of films consisting of more than one metal-non-metal reaction product, since for certain purposes it is advantageous to introduce controlled amounts of more than two components.

The principal reaction between the metallic element and a non-metal of the periodic group VIB (O, S, Se and Te) occurs on the surface of an article or target. The character of the deposit is not influenced visibly by the rate of introduction or production of the non-metal vapor after stoichiometric are reached upon the surface.

At an operating pressure of $10^{-4}$ mm. of mercury or less, where the mean free path of evaporated atoms or molecules are comparable to the dimensions of the vessel, objects are sharply shadowed as they would be in the case of metal evaporation alone. No difference in behavior has been observed when metals are evaporated alone or in the presence of these non-metal vapors.

The formation of a compound from the metal and non-metal having the highest proportion of non-metal seems to be favored. Thus, in the production of iron sulfide films, $FeS_2$, appears to be produced rather than $FeS$ or $Fe_2S_3$.

The identification of the exact compound in such a thin film is not easy. Electron diffraction patterns from such films show very few lines, indicating that the deposits are essentially amorphous. Where patterns are obtained and identified, it appears that the heat of the electron beam has produced crystallization. A film of tin sulfide, for instance, showed diffraction lines ascribable to $SnS$ and $SnS_2$, but the films were found to be evaporating from the heat during examination in the electron microscope. X-ray diffraction patterns made of films removed from surfaces of coated articles and examined in a powder camera failed to show crystalline structure.

One form of apparatus suitable for the production of articles on a small scale is described. The general type of apparatus is well known in the art, with the few specific requirements of the process of the present invention and for the particular articles produced set forth in the necessary detail.

The evaporating zone comprises a glass bell jar; a base plate therefor carrying a plurality of insulated electrical terminals adapted to introduce current to heating elements within the bell jar, one or more evaporator supports, and one or more target supports; and a vacuum pump or pumps of various capacities, to produce and maintain the degree of vacuum required within the bell jar. The resistance heating elements, hereinafter described, are energized with low voltage current from a transformer supplied through 110 volt lines through an adjustable transformer.

The metal evaporation boat consists of a heating element of a helical basket of molybdenum wire 0.040 inch in diameter, coated with aluminum oxide. This coating is produced by covering the helical basket with "Alundum" cement moistened with a dilute solution of sodium silicate in water, forming a cavity in the moist cement for subsequently holding the metal being evaporated, air-drying the cement, and then firing in a vacuum to out-gas and sinter the aluminum oxide. The metal evaporator is centrally positioned on the evaporator support in the bottom of the evaporating zone. A shutter, operable from outside the bell jar through a gland in the base therefor, may be placed over the boat if this is the first heating of a fresh metal charge. This will prevent spattering during the outgassing, prevent damage to the surface to be coated, or prevent metal prematurely evaporated from reaching the target.

The non-metal boiler (for sulfur, selenium or tellurium) consists of a glass ampule 1½" long, ¾" in diameter and with a throat ¼" in diameter supported in a helically wound heating element of 16 gauge "Nichrome" wire. The non-metal boiler or evaporator is supported between the metal evaporator and the wall of the bell jar in the bottom of the evaporating zone, with the throat of the ampule inclined so that vapor issuing therefrom is generally directed toward the surface being coated while the latter is positioned generally above the metal evaporator and in the upper part of the evaporating zone.

A radiation shield is placed between the non-metal boiler or vapor generator and the metal evaporator so that the rate of evolution of non-metal is controlled more readily without appreciable radiation from the metal evaporator.

When oxygen is the non-metal to be used in the deposition of a metal oxide film, either the oxygen is generated by the thermal treatment of an appropriate charge within the evaporating zone, or by the regulated introduction of oxygen through a valved line through the base plate of the bell jar.

The targets, or receiving surfaces to be coated, are cleaned appropriately by scouring, solvent washing, wiping, brushing, or any other means adaptable for removing foreign film and lint which would interfere with the deposition of a surface layer of good quality or would produce pin holes in the coating. In the case of rock salt infrared windows, this may be done conveniently by polishing the surface with rouge and alcohol on a lintless lap and wiping with alcohol on a lintless cloth. After installing in the evaporating zone, the surface may be brushed with a clean camels hair brush. Also, the operation of a glow discharge in the evaporating zone as the bell jar is being pumped down may aid in cleaning the surface to be coated.

The cleaned targets, or receiving surfaces being coated, are supported by suitable clamping means by their edges at a height above the metal evaporator determined in part by the thickness which it is desired to apply. It is, of course, to be clearly understood that the inverse square law applies—that a surface placed at twice the distance from the vapor source will receive one fourth the amount of deposit per unit area.

A radiant heater may be placed above the articles being coated and this heater energized sufficiently to prevent the condensation of non-metal, either because of relatively low ambient temperature or when using one of the higher boiling non-metals, such as selenium or tellurium.

A typical procedure is presented for coating the surface of a rock salt window with silver sulfide. About one gram of pure silver is placed in the metal evaporator and between 3 and 5 grams of resublimed sulfur are introduced into the ampule of the non-metal boiler.

Although visual observation suffices for most work, a thermocouple may be spot welded to the non-metal ampule heater or inserted into the ampule to indicate the sulfur temperature.

The bell jar is sealed on the base plate gasket and a roughing pump started. When the pressure reaches 100 microns, as indicated by a Pirani or thermocouple type gauge installed in the base plate, the roughing pump valve is closed and the main vacuum valve opened. When the pressure has fallen to 1 micron, an ion gauge is turned on.

At this point, current is supplied to the sulfur boiler and the silver evaporator. A shutter is moved between the latter and the rock salt target.

Proper operation of the sulfur boiler is recognized when the sulfur has melted to a clear layer and may be seen to boil gently. Some refluxing occurs initially and droplets may be seen to run down the walls of the ampule. A film of sulfur may form on the bell jar in a cool place, but it usually collects on the base plate. The target surface is examined to make sure that no sulfur is adhering to it, and, if necessary, the window being coated is heated with a radiant heater to prevent any such deposition.

When the pressure has been reduced to about $8 \times 10^{-5}$ mm. Hg, the temperature of the boat containing the silver is raised until the silver is seen to melt, form a globule, and begin to evaporate. The shutter above the silver evaporator is swung aside to permit the metal vapor to reach the surface of the rock salt window. Evaporation of the silver is recognized by the formation on the bell jar and on the window of a clear yellow film.

Evaporation is continued until the desired thickness of coating is attained as determined by color, or light transmission compared to a reference previously prepared and found satisfactory. The current to the evaporators is turned off, the high vacuum valve closed and air admitted slowly to the evaporating zone through a small bleeder valve.

Failure to provide an adequate supply of sulfur vapor will be recognized by the "muddy" appearance of the coatings. Upon examination such coatings will appear "matte" rather than glossy and will be found to rub off easily.

With a sulfur temperature at 150° C., which is somewhat too high, sulfur has a vapor pressure of 0.2 mm. Hg. With an evaporating surface of 1.5 sq. cm., its rate of evaporation is 0.45 gram/minute. With the simultaneous evaporation of 0.2 gram of silver in five minutes, the weight ratio of silver to sulfur is 0.04:0.45, or about 1 mole: 100 moles, to form silver sulfide, $Ag_2S$.

However with a more satisfactory operating temperature of 125° C., which is just above the melting point of sulfur, the vapor pressure of sulfur is 0.06 mm. Hg, thus reducing the sulfur evaporation rate about one third to a mole ratio of about 1:30. This insures an adequate excess of sulfur.

*Example 1*

An example is given for making an infrared transmitting filter with a coating of silver sulfide on potassium bromide.

A polished single crystal window of potassium bromide was exposed simultaneously to an excess of sulfur vapor and silver vapor as set forth in the general description of the manipulative procedures above. The pressure in the evaporating zone was below $8 \times 10^{-5}$ mm. Hg, the sulfur temperature was 125° C., and the silver temperature was about 1000 to 1025° C.

The clear yellow coating produced showed excellent adhesion even in the presence of water vapor. The light transmitting properties were measured with a Perkin-Elmer double beam infrared spectrometer. The coated crystal window was observed to transmit very little of the visible portion of the spectrum but showed transmission of 70 to 80% of the infrared radiation beyond 1 mu.

*Example 2*

An example is given for making infrared filters with a coating of copper sulfide on glass, plastic and rock salt.

The blanks were exposed simultaneously to an excess of sulfur vapor and copper vapor produced from metal heated in an "Alundum" crucible with an embedded heating coil of molybdenum wire. The pressure in the evaporating zone was below $8 \times 10^{-5}$ mm. Hg, the sulfur temperature was 125° C., and the copper temperature was about 1250 to 1275° C.

Adhesion of the clear, greenish-yellow coating on all of the materials was good. The transmission curves showed no infrared transmission and a peak in the visible spectrum in the yellow-green region. The transmission in the visible region was reduced to about 10% for the thickness of coating applied.

*Example 3*

An example is given for making an infrared filter with a coating of antimony sulfide on calcium fluoride.

A polished disc of calcium fluoride was mounted in the evaporating zone ten inches above an "Alundum" boat indirectly heated by a tantalum metal trough-resistor in which the boat rested. The pressure in the evaporating zone was below $8 \times 10^{-5}$ mm. Hg, the sulfur temperature was 125° C. and the antimony temperature was about 650 to 675° C.

A coating of dark-orange antimony sulfide formed on the calcium fluoride disc. The density of the coating was judged by observing the color and comparison with a previous specimen which had been measured and found to give approximately the desired transmission. The deposition was discontinued before full density was attained. The transmission of the calcium fluoride with this sulfide coating, measured on a Perkin-Elmer double beam infrared spectrometer, showed the principal transmission peak to be at 4.75 mu.

This partially coated blank was replaced in the evaporating zone and a clean glass slide was supported next to it. Evaporation of the sulfur and antimony was resumed after evacuation and continued until the slide was observed to show a blue interference color by reflected light. The calcium fluoride with this coating now gave a transmission of 89% at 5.15 mu.

*Example 4*

An example is given for making a non-reflecting protective coating of aluminum oxide on rock salt.

A ¼" diameter copper tube, sealed in the base plate of the evaporating zone, terminated about two inches below and to one side of the rock salt target. A needle control valve on the outer end of the tube was connected to a cylinder of oxygen. Pieces of sheet aluminum were hung from a heavy molybdenum wire resistor, about eight inches below the rock salt target. After reducing the pressure in the evaporating zone to $2 \times 10^{-5}$ mm. Hg, oxygen was admitted until the pressure rose to $8 \times 10^{-5}$ mm. Hg. Current was passed through the molybdenum wire until the aluminum fused, wet the surface of the wire and began to evaporate. As the aluminum vapor was evolved, the pressure fell and then the needle valve was opened further to maintain a pressure of $8 \times 10^{-5}$ mm. Hg. Termination of the evaporation was indicated by a pressure rise since no further evolution of aluminum vapor was taking place.

An examination of the treated rock salt crystal shape showed that a perfectly transparent film of aluminum oxide had been formed, and that the film was very adherent and gave marked protection of the surface against water vapor. The infrared transmission was found to 90 to 95% at 10 mu and to fall gradually to 80% at 14 mu.

Example 5

An exampule is given for making a visible light filter with a coating of silver selenide on rock salt.

About two grams of pure selenium was placed in an evaporator similar to that heretofore used for vaporizing sulfur. The silver was in an "Alundum" boat formed in a cone of molybdenum wire resistor. A polished rock salt window was placed ten inches above the silver vaporizer and a radiant heater of "Nichrome" wire was mounted above and in close proximity to the target to prevent selenium vapor from condensing thereon. During the coating operation, the pressure in the evaporating zone was $5 \times 10^{-5}$ mm. Hg, the selenium temperature was 340° C., and the silver temperature was about 1000 to 1025° C. The evaporation was continued until the silver surface was barely visible through the window from the top of the bell jar.

The transmission through the coated rock salt window was found to be about 50% in the infrared region from 2 to 14 mu.

Example 6

An example is given for making a visible light filter with a coating of silver telluride on rock salt.

A polished rock salt window was mounted eight inches above the silver vaporizer and about three grams of pure tellurium was placed in the non-metal vaporizer. The pressure in the vaporizing zone was $5 \times 10^{-5}$ mm. Hg. The tellurium alone was first vaporized until a deposit was formed on the salt window. The radiant heater was then energized until the deposit resublimed and the window became clear. With this same heater current, and with the tellurium still vaporizing, the silver containing crucible was raised to evaporating temperature. The tellurium temperature was about 475° C. and the silver temperature was about 1000 to 1025° C. When the window became opaque as viewed from against the light from the silver vaporizer deposition was terminated.

Infrared transmission measured with the Perkin-Elmer double beam spectrometer showed zero transmission to 1.5 mu, then a rise to 50% at 4 mu up to 70% from 10 to 15 mu.

Example 7

An example is given for making the optical parts of welding goggles with an infrared absorbing coating of iron sulfide on glass and plastic lenses.

Glass and plastic blanks were exposed simultaneously to an excess of sulfur vapor and iron vapor produced from metal heated in an "Alundum" crucible with an embedded heating coil of molybdenum wire. The pressure in the evaporating zone was below $8 \times 10^{-5}$ mm. Hg, the sulfur temperature was 125° C. and the iron temperature was about 1400 to 1425° C.

The steel gray coatings produced showed good adhesion and were essentially neutral in color when viewed by transmitted light. The coated lenses were examined with an infrared spectrometer and found to transmit no radiation on the low frequency side of 1 mu.

Example 8

An example is given for the making of optical parts of sun-glasses with a coating of cobalt sulfide on plastic lenses.

Plastic blanks were exposed simultaneously to an excess of sulfur vapor and cobalt vapor with the pressure in the evaporating zone below $8 \times 10^{-5}$ mm. Hg. The sulfur temperature was 125° C. and the cobalt temperature was about 1600 to 1625° C.

The cobalt sulfide coating produced was neutral in shade and transmitted no infrared radiation beyond 1 mu as measured with the Perkin-Elmer double beam spectrometer.

Example 9

An example is given for the preparation of a photosensitive coating of lead sulfide on glass.

A glass microscope slide, painted at each end with a conducting layer of silver paint, was supported twelve inches above an "Alundum" boat containing 0.4 gram of metallic lead and heated by an indirect tantalum resistor. The slide was exposed simultaneously to an excess of sulfur vapor and lead until all the lead was vaporized, with the pressure in the evaporation zone below $8 \times 10^{-5}$ mm. Hg, the sulfur temperature 125° C., and the lead temperature about 700 to 725° C. This gave a calculated thickness of layer of lead sulfide on the slide of 1 micron.

The electrical resistance of the coating on the slide was found to be 4 megohms and did not change with exposure to light. However, after heating the coated slide for 30 minutes in air at 250° C., the electrical resistance was 20 megohms, and, upon exposure to light, dropped to 18 megohms.

Example 10

An example is given for the preparation of a photosensitive coating of silver sulfide on glass.

Glass microscope slides, painted at each end with a conducting layer of silver paint, were supported ten inches above an "Alundum" evaporator containing silver metal. The slides were exposed simultaneously to an excess of sulfur vapor and silver vapor at a pressure below $7 \times 10^{-5}$ mm. Hg. The sulfur temperature was 125° C. and the silver temperature was 1000 to 1025° C.

The silver layer so produced showed an electrical resistance of 50 megohms. On heating for two days in air at 185° C., the resistance rose to 150 megohms. A lowering of resistance was observed on exposure to light or near infrared radiation.

Example 11

An example is given for making an infrared transmitting filter with a coating of antimony sulfide on calcium fluoride.

A calcium fluoride blank was exposed simultaneously to an excess of sulfur vapor and antimony vapor at a pressure below $8 \times 10^{-5}$ mm. Hg until the coating was reflecting third order magenta as viewed on a glass slide mounted beside the filter blank. The sulfur temperature was 125° C. and the antimony temperature was about 650 to 675° C. The vacuum was broken and a tantalum boat-evaporator containing fused lithium fluoride was installed in place of the antimony evaporator. At the pressure below $8 \times 10^{-5}$ mm. Hg and a temperature of about 800 to 825° C., the lithium fluoride vaporized, and its deposition continued until a thickness of third order magenta by reflection was observed on a clean glass slide. The vacuum was again broken, the antimony vaporizer reinstalled and another antimony sulfide layer deposited using another clean slide for observation of the extent of the deposit. A total of five layers of antimony sulfide and four layers of lithium fluoride were thus deposited using a clean monitoring during each evaporation.

The transmission of this multi-layer filter was measured with the Perkin-Elmer double beam spectrometer. Transmission peaks of 40% at 1.2 mu, 65% at 1.45 mu, 65% at 1.9 mu, 75% at 3.5 mu, and 89% at 7.2 mu were observed. From 4.3 to 6.2 the transmission was zero.

This invention is directed to the deposition of thin layers of metal oxides, sulfides, selenides and tellurides, which are capable of being formed by the reaction of a metal vapor and a non-metal vapor in an evacuated zone. Some such coatings have been hitherto prepared merely by evaporating the compound concerned. However, many such compounds dissociate under the temperature and at the pressure required for evaporation, with the result that at best the coating deposited has a lower state of oxidation than the starting compound, or is a mixture of several materials.

Furthermore, several of the compounds are well known but their volatility is so low that they cannot be used to produce coatings by evaporation. For example, at 1227° C., ThS, $Th_2S_3$, $Th_4S_7$, US, CeS, $Ce_3S_4$, $Hf_2S_3$, $Zr_2S_3$ and BaS are non-volatile, and the rest of the rare-earth sulfides as well as the sulfides of Cb, V and Sc could also be included. Thus, the present process permits the production of thin layers of compounds which have not hitherto been possible.

Properties of metal oxides, particularly as they relate to dissociation, melting point and vapor pressure, are given to Leo Brewer, University of California, Berkeley, Thermodynamic properties of Oxides and Their Vaporization Processes, Chemical Reviews 52 (1), 1–75 (1953) February.

Properties of metal oxides, sulfides, selenides and tellurides, particularly decomposition temperature, melting point, boiling point and refractive index, are given in Alexander Silverman, Chairman of Committee, Data on Chemicals for Ceramic Use, Bulletin of National Research Council No. 118, 1–193 (1949) June.

Properties of metal sulfides, particularly melting point and volatility, are given in Leo Brewer, et al., Thermodynamic and Physical Properties of . . . Sulfides . . ., Quill, Chemistry and Metallurgy of Miscellaneous Materials, 1–329 (1950) at 40–59.

The present process is carried out in an evacuated zone of less than $10^{-3}$ mm. Hg pressure, preferably $10^{-3}$ to $10^{-6}$ mm. Hg.

In carrying out the evaporation of a metal in the evacuated zone, the temperature of the metal must be maintained to afford an effective rate of volatilization. At the pressure used in the evacuated zone, the temperature of the metal being vaporized should be substantially that which corresponds to the vapor pressure of the metal between $7.6 \times 10^{-3}$ to $2.5 \times 10^{-2}$ mm. Hg. The respective temperatures may be determined by reference to the temperatures corresponding to the vapor pressures of the respective metals at $10^{-5}$ atm. ($7.6 \times 10^{-3}$ mm. Hg) and $10^{-4}$ atm. ($7.6 \times 10^{-2}$ mm. Hg) are given in Leo Brewer, Thermodynamic and Physical Properties of the Elements, Quill, Chemical and Metallurgy of Miscellaneous Materials, 1–329 (1950) at 28–9 (M.P.) and 30–1 (V.P.).

Of the non-metals in periodic group VIB with which we are here concerned, oxygen is the only one which is a gas under standard conditions. Therefore, it may be introduced as a gas into the evacuated zone in which the metal is being vaporized, or prepared therein by the controlled heating of any one of several well known and suitable charges for this purpose.

The other three non-metals of periodic group VIB, sulfur, selenium and tellurium, are solids under standard conditions. Therefore, each one of them must be vaporized in the evacuated zone simultaneously with the metal being used for reaction therewith in vapor form to deposit a thin layer of the resulting compound. Of course, various proportions of metal to non-metal may be employed, but generally it is preferable to have a sufficient excess of non-metal in order that the reaction product with the metal in the highest oxidation state results. At the pressure used in the evacuated zone, the temperature of the non-metal being vaporized should be substantially that which corresponds to the vapor pressure of the non-metal between $5 \times 10^{-2}$ and $10^{-1}$ mm. Hg. The respective temperatures may be determined by reference to the temperatures corresponding to the vapor pressures of the respective non-metals in the last reference cited above.

The range of pressure hereinbefore set forth for use in the evacuated zone and the corresponding temperatures for metal and non-metal to produce and maintain their respective partial pressures are suitable for satisfactory operation in the present state of the art. However, the production of pressures in the evacuated zone lower than $10^{-6}$ mm. Hg and the use of appropriately lower temperatures of metal and non-metal for the vaporization thereof clearly comes within the scope of the present invention.

From the foregoing description, including examples, it will be seen that the present invention provides a process for the production of new and useful optical elements and instruments indicated as follows:

(1) Coatings which are substantially transparent to infrared, but let through little or no visible light.

(2) Filters for infrared which transmit preferentially a desired wave length, where the optical thickness is lambda/2. These may be combined with other filters to isolate spectral regions.

(3) Filters with films of cobalt sulfide, copper sulfide, iron sulfide, and the like, on glass or plastic, such as cellulose acetate and vinyl polymers, which will transmit a portion of the visible spectrum while absorbing substantially all of the infrared and ultraviolet radiation—sun glasses, welding goggles, and the like.

(4) Non-reflecting coatings for visible or infrared regions of the spectrum. For a single layer film of lambda/4 thickness, reflection becomes zero when $n_2 = (n_1)^{1/2}$, where $n_1$ is the refractive index of the substrate and $n_2$ is the refractive index of the coating for two superposed lambda/4 films reflection is zero when $n_2 = (n_1 n_3)^{1/2}$, where $n_1$ is the refractive index of the substrate and $n_2$ and $n_3$ are the indices of the two layers.

(5) Multilayer interference filters of the dielectric type where alternate layers of lambda/2 thickness with high and low dielectric constants (refractive indices), as silver sulfide with $n=3.1$ and lithium fluoride with $n=1.39$, are applied. Filters of this type have been made up to nine layers with no difficulty other than careful control of the optical thickness of the respective layers.

(6) Coatings on water soluble materials, such as rock salt and potassium bromide, to render them less susceptible to atmospheric moisture without impairing light transmission characteristics.

(7) Photosensitive cells with coatings such as lead sulfide, lead selenide or lead telluride. After the first step of coating they are insensitive because they are not non-metal deficient. However, on heating in air or oxygen or exposure to ozone, such coatings are activated.

(8) Layers of semi-conductors in which impurity centers are introduced by evaporation of a third component while the main layer is being formed.

(9) Radiation detecting "flakes" of semiconductors, such as lead sulfide, by evaporating first on a water soluble substrate, like potassium chloride, on a smooth surface. After applying two spots of silver paint, each with a fine connecting wire, a sulfide, selenide or telluride is evaporated upon the surface, with masking if desired. Supports are attached to the "flake" connections and, after dissolving the potassium chloride, the layer is freed and it becomes self-supporting.

(10) Decorative mirrors with thin layers of material, such as copper sulfide which gives a deep blue mirror of great beauty and with excellent stability.

It will be seen, therefore, that this invention actually may be carried out by the use of various modifications and changes without departing from its spirit and scope, with only such limitations thereon as are imposed by the prior art.

I claim:

1. A process for depositing molecular layers of the reaction product of a metal vapor and a vaporized non-metal selected from the group consisting of oxygen, sulfur, selenium and tellurium on the surface of an article which comprises a. maintaining said article in an evacuated zone between $10^{-3}$ and $10^{-6}$ mm. Hg pressure, b. maintaining the temperature of the surface of the article above the condensation point of the non-metal for the pressure employed, and c. simultaneously exposing the surface of the article to said metal and non-metal vapors for the length of time required for the deposition of a layer of said reaction product of the desired thickness on the surface of said article.

2. A process for the depositing of molecular layers of the reaction product of a metal vapor and a vaporized non-metal selected from the group consisting of oxygen, sulfur, selenium and tellurium on the surface of an article which comprises a. maintaining said article in an evacuated zone between $10^{-3}$ and $10^{-6}$ mm. Hg pressure, b. maintaining the temperature of the surface of the article above the condensation point of the non-metal for the pressure employed, and c. simultaneously exposing the surface of the article to said metal vapor and a sufficient excess of said non-metal vapor to form a reaction product having substantially more than the minimum proportion of non-metal for a length of time required for the deposition of a layer of said reaction product of the desired thickness on the surface of said article.

3. A process for depositing molecular layers of the reaction product of a metal vapor and a vaporized non-metal selected from the group consisting of oxygen, sulfur, selenium and tellurium on the surface of an article which comprises a. maintaining said article in an evacuated zone between $10^{-3}$ and $10^{-6}$ mm. Hg pressure, b. maintaining the temperature of the surface of the article above the condensation point of the non-metal for the pressure employed, and c. simultaneously exposing the surface of the article to said metal vapor and of a sufficient excess of said non-metal vapor to form a reaction product having substantially the highest proportion of non-metal for a length of time required for the deposition of a layer of said reaction product of the desired thickness on the surface of said article.

4. A process for depositing molecular layers of the reaction product of a metal vapor and a vaporized non-metal selected from the group consisting of oxygen, sulfur, selenium and tellurium on a surface of an article which comprises a. maintaining said article so that said surface thereof is in an evacuated zone between $10^{-3}$ and $10^{-6}$ mm. Hg pressure, b. maintaining the temperature of the surface of the article above the condensation point of the non-metal for the pressure employed, c. simultaneously exposing the surface of the article to said metal vapor and of a sufficient excess of said non-metal vapor to form a reaction product having substantially the highest proportion of non-metal for a length of time required for the deposition of a layer of said reaction product of the desired thickness on the surface of said article, and d. thereafter heating the surface of the article so coated in an oxidizing atmosphere at a sufficiently elevated temperature and for a sufficient length of time to reduce the proportion of non-metal in the reaction product of the deposited surface layer.

5. A process for depositing a thin film of a reaction product of a metal vapor and the vapor of a non-metal selected from the group consisting of oxygen, sulfur, selenium and tellurium which comprises a. maintaining a film-supporting surface of relatively soluble material in an evacuated zone between $10^{-3}$ and $10^{-6}$ mm. Hg pressure, b. maintaining the temperature of said supporting surface above the condensation point of said non-metal for the pressure employed, c. simultaneously exposing the film-supporting surface to said metal and non-metal vapors for a length of time required for the deposition of a layer of said reaction product of the desired thickness on said film supporting surface, and d. separating the thin film of reaction product from the supporting surface by treating the latter with a solvent therefor but a non-solvent for said film.

6. A process for depositing thin layers of the reaction product of a metal vapor and the vapor of a non-metal selected from the group consisting of oxygen, sulfur, selenium and tellurium on a surface of an article which comprises a. maintaining said article so that said surface thereof is in an evacuated zone between $10^{-3}$ and $10^{-6}$ mm. Hg pressure, b. maintaining the temperature of the surface of the article above the condensation point of the non-metal for the pressure employed, and c. simultaneously exposing the surface of the article to said metal vapor, said non-metal vapor, and a small proportion of a second metal vapor for a length of time required for the deposition of a layer of said reaction product of the desired thickness on the surface of said article, whereby the small proportion of said second metal vapor introduces a third component as impurity centers during the formation of the main layer of semiconductor reaction product.

7. A process for depositing a thin layer of the reaction product of a metal vapor and the vapor of a non-metal selected from the group consisting of oxygen, sulfur, selenium and tellurium on the surface of an article which comprises a. maintaining said article in an evacuated zone at between $10^{-3}$ and $10^{-6}$ mm. Hg pressure, b. maintaining the temperature of the surface of the article above the condensation point of the non-metal for the pressure employed, c. heating the metal in the evacuated zone to a temperature which corresponds to its vapor pressure between $7.6 \times 10^{-3}$ and $2.5 \times 10^{-2}$ mm. Hg, and d. simultaneously exposing the surface of the article to said metal and non-metal vapors for the time required for the deposition of a layer of said reaction product of the desired thickness on said surface.

8. A process for depositing a thin layer of the reaction product of a metal vapor and the vapor of a normally solid non-metal selected from the group consisting of oxygen, sulfur, selenium and tellurium on the surface of an article which comprises a. maintaining said article in an evacuated zone at between $10^{-3}$ and $10^{-6}$ mm. Hg pressure, b. maintaining the temperature of the surface of the article above the condensation point of the non-metal for the pressure employed, c. heating the metal in the evacuated zone to a temperature which corresponds to its vapor pressure between $7.6 \times 10^{-3}$ and $2.5 \times 10^{-2}$ mm. Hg, d. heating the non-metal in the evacuated zone to a temperature which corresponds to its vapor pressure between $5 \times 10^{-2}$ and $10^{-1}$ mm. Hg and, e. simultaneously exposing the surface of the article to said metal and non-metal vapors for the time required for the deposition of a layer of said reaction product of the desired thickness on said surface.

9. A process for depositing a thin layer of a reaction product of a metal vapor and sulfur vapor on the surface of an article which comprises a. maintaining the article in an evacuated zone between $10^{-3}$ and $10^{-6}$ mm. Hg pressure, b. maintaining the temperature of the surface of the article above the condensation point of sulfur for the pressure employed, c. heating the metal in the evacuated zone to a temperature which corresponds to the vapor pressure of the metal between $7.6 \times 10^{-3}$ and $2.5 \times 10^{-2}$ mm. Hg, d. heating the sulfur in the evacuated zone to between 120 and 130° C., and e. simultaneously exposing the surface of the article to said metal and sulfur vapors for the time required for the deposition of a layer of said reaction product of the desired thickness on said surface.

10. A process for the deposition of a thin layer of a reaction product of a metal vapor and selenium vapor on the surface of an article which comprises a. maintaining said article in an evacuated zone between $10^{-3}$ and $10^{-6}$ mm. Hg pressure, b. maintaining the temperature of the surface of the article above the condensation point of selenium for the pressure employed, c. heating the metal in the evacuated zone to a temperature which corresponds to the vapor pressure of the metal between $7.6 \times 10^{-3}$ and $2.5 \times 10^{-2}$ mm. Hg, d. heating the selenium in the evacuated zone to between 330 and 350° C., and e. simultaneously exposing the surface of the article to said metal and selenium vapors for the time required for the deposition of a layer of said reaction product of the desired thickness on said surface.

11. A process for depositing a thin layer of the reaction product of a metal vapor and tellurium vapor on the surface of an article which comprises a. maintaining said article in an evacuated zone between $10^{-3}$ and $10^{-6}$ mm. Hg pressure, b. maintaining the temperature of the surface of the article above the condensation point of tellurium for the pressure employed, c. heating the metal in the evacuated zone to a temperature which corresponds to the vapor pressure of the metal between $7.6 \times 10^{-3}$ and $2.5 \times 10^{-2}$ mm. Hg, d. heating the tellurium in the evacuated zone to between 460 and 490° C., and e. simultaneously exposing the surface of the article to said metal and tellurium vapors for the time required for the deposition of a layer of the reaction product of the desired thickness on said surface.

12. An optical element which comprises a. a transparent substrate, and b. a thin non-crystalline layer thereon of the highest stoichiometrical proportion and simultaneously deposited reaction product of a metal vapor and a non-metal selected from the group consisting of oxygen, sulfur, selenium and tellurium.

13. An optical element which comprises a. a transparent crystalline substrate, and b. a thin non-crystalline layer thereon of the highest stoichiometrical proportion and simultaneously deposited reaction product of a metal vapor and the vapor of a non-metal selected from the group consisting of oxygen, sulfur, selenium and tellurium.

14. An optical element which comprises a. a single crystal substrate, and b. a thin non-crystalline layer thereon of the highest stoichiometrical proportion and simultaneously deposited reaction product of a metal vapor and the vapor of a non-metal selected from the group consisting of oxygen, sulfur, selenium and tellurium.

15. A filter element comprising a. a transparent crystalline water-soluble substrate, and b. a thin non-crystalline layer thereon of a water-repellent highest stoichiometrical proportion and simultaneously deposited reaction product of a metal vapor and a vapor of a non-metal selected from the group consisting of oxygen, sulfur, selenium and tellurium.

16. A filter element comprising a. a transparent substrate, and b. alternate thin layers of high and low refractive index thereon wherein at least the layers of one refractive index are the non-crystalline highest stoichiometrical proportion and simultaneously deposited reaction product of a metal vapor and the vapor of a non-metal selected from the group consisting of oxygen, sulfur, selenium and tellurium.

17. An optical device for the protection of biological tissue from harmful radiations which comprises.

a. a transparent plastic base, and b. a thin non-crystalline layer of the highest stoichiometrical proportion and simultaneously deposited reaction product of sulfur vapor and the vapor of a metal selected from the group consisting of iron, cobalt, nickel and copper.

18. A semi-conducting element comprising a. a substantially rigid electrically insulating substrate, and b. a thin layer of material thereon resulting from the partial oxidation of a thin non-crystalline layer of the highest stoichiometrical proportion and simultaneously deposited reaction product of lead vapor and the vapor of a non-metal selected from the group consisting of sulfur, selenium and tellurium.

19. A semi-conducting element which comprises a. A substantially rigid electrically insulating substrate, and b. a thin non-crystalline layer thereon of the highest stoichiometrical proportion and simultaneously deposited reaction products of (1) the vapor of a non-metal selected from the group consisting of oxygen, sulfur, selenium and tellurium, (2) the vapor of a metal, and (3) a small and controlled amount of the vapor of a second metal, whereby impurity centers of the compound of the second metal are deposited simultaneously in the main layer of the compound of the first metal.

20. A non-reflecting optical element which comprises a. a transparent substantially rigid substrate, and b. a thin non-crystalline layer thereon of the highest stoichiometrical proportion and simultaneously deposited reaction product of aluminium vapor and oxygen vapor, wherein the optical thickness of said layer is quarter wave length for that portion of the spectrum at which non-reflection is required.

References Cited in the file of this patent

UNITED STATES PATENTS

| | | |
|---|---|---|
| 2,252,770 | Janes | Aug. 19, 1941 |
| 2,363,781 | Ferguson | Nov. 28, 1944 |
| 2,394,533 | Colbert et al. | Feb. 12, 1946 |
| 2,519,545 | Colbert et al. | Aug. 22, 1950 |
| 2,539,149 | Miller | Jan. 23, 1951 |
| 2,552,184 | Koch | May 8, 1951 |
| 2,578,956 | Weinrich | Dec. 18, 1951 |
| 2,587,036 | Germer et al. | Feb. 26, 1952 |
| 2,625,496 | Swift et al. | Jan. 13, 1953 |
| 2,642,367 | Pfund | June 16, 1953 |
| 2,659,678 | Cusano et al. | Nov. 17, 1953 |
| 2,695,852 | Sparks | Nov. 30, 1954 |
| 2,732,312 | Young | Jan. 24, 1954 |